(12) United States Patent
Rekhi

(10) Patent No.: US 9,619,846 B2
(45) Date of Patent: Apr. 11, 2017

(54) SYSTEM AND METHOD FOR RELEVANCE-BASED SOCIAL NETWORK INTERACTION RECOMMENDATION

(71) Applicant: LinkedIn Corporation, Mountain View, CA (US)

(72) Inventor: Sachin Rekhi, Mountain View, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 385 days.

(21) Appl. No.: 13/903,263

(22) Filed: May 28, 2013

(65) Prior Publication Data

US 2014/0324846 A1 Oct. 30, 2014

Related U.S. Application Data

(60) Provisional application No. 61/817,050, filed on Apr. 29, 2013.

(51) Int. Cl.
G06F 17/30 (2006.01)
G06Q 50/00 (2012.01)
G06Q 10/10 (2012.01)

(52) U.S. Cl.
CPC ............. *G06Q 50/01* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 2011/0022602 A1* | 1/2011 | Luo et al. | 707/748 |
| 2011/0072035 A1* | 3/2011 | Gaucas et al. | 707/769 |
| 2012/0136866 A1* | 5/2012 | Carter et al. | 707/740 |
| 2012/0166532 A1* | 6/2012 | Juan et al. | 709/204 |
| 2012/0191777 A1* | 7/2012 | Iwasaki et al. | 709/204 |
| 2013/0041735 A1* | 2/2013 | Johnson et al. | 705/14.23 |
| 2014/0089320 A1* | 3/2014 | Baldwin et al. | 707/748 |

* cited by examiner

*Primary Examiner* — Hung Q Pham
(74) *Attorney, Agent, or Firm* — Schwegman Lundberg & Woessner, P.A.

(57) ABSTRACT

System and method for recommending to a member of a social network an interaction with ones of a plurality of entities. Events related to individual ones of the plurality of entities are obtained. A relevance of ones of the events to the member is determined based on at least one characteristic of ones of the events and a trait of the member. Recommended interactions with ones of the plurality of entities individually related to the ones of the events based on the relevance for each of the events are presented to the user.

22 Claims, 4 Drawing Sheets

SYSTEM AND METHOD FOR RELEVANCE-BASED SOCIAL NETWORK INTERACTION RECOMMENDATION

PRIORITY

This application claims priority to U.S. Provisional Application No. 61/817,050, filed Apr. 29, 2013, titled "SYSTEM AND METHOD FOR RELEVANCE-BASED SOCIAL NETWORK INTERACTION RECOMMENDATION", which is incorporated herein by reference in its entirety.

TECHNICAL FIELD

The subject matter disclosed herein generally relates to social network interaction and systems and methods for recommending same.

BACKGROUND

Contemporary social networks may provide recommendations to users of the social network. The recommendations may be based on a comparison of a member's profile with information about another entity related to the social network. For instance, a social network may compare the member's profile with data related to another member and conclude that the members may want to incorporate one another into their respective social graphs, such as by the members make a connection in the social network. By further example, a social network may compare a shared piece of content on the social network with the profile of the member and recommend the shared content to the member.

BRIEF DESCRIPTION OF THE DRAWINGS

Some embodiments are illustrated by way of example and not limitation in the figures of the accompanying drawings.

DETAILED DESCRIPTION

Example methods and systems are directed to the generation of relevance-based social network interaction recommendations. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Such recommendations described above may be presented from the perspective of establishing new contacts in the social network or presenting new content to a social network member. Such recommendations may not, however, be based on the maintenance of existing social network connections and relationships. For instance, while a social network may provide recommendations for the creation of new connections, the social network may not provide recommendations related to improving the relationship between an existing connection.

Further, to whatever extent the social network may, for instance, provide an indication that it is a member's birthday, and solicit birthday wishes for the member, such recommendations may be oblivious to the relevance of the event to the members to whom the information is displayed. For instance, one member's birthday message may simply be distributed to all of the member's connections. Similarly, while certain information may be selectively displayed to certain members of the social network, such as only to members of a particular group, such information may not be or include a recommended interaction within the social network and may not be based on any particular relevance of the information to the individual members of the group; the fact that a member belongs to a group relating to their high school graduating class may not have any relevance to a professional article posted to the group by another group member.

A social network system and method has been developed that obtains social network events, determines the relevance of each of the events to a member of the social network, and presents recommended interactions to the member based on the relevance of the various events. The nature of the events may be diverse. For instance, the event may reflect a milestone, such as a birthday, anniversary, change of status (employment, location, etc.), and the like. The event may reflect an action or accomplishment, such as an entity making a publication. Or the event may reflect inaction, such as a certain amount of time having passed since a member has interacted with a particular entity. The relevance may take into account various factors, such as elapsed time, social connection strength, social connection history, and interaction outside of the social network itself.

Social Network

Figure 1:
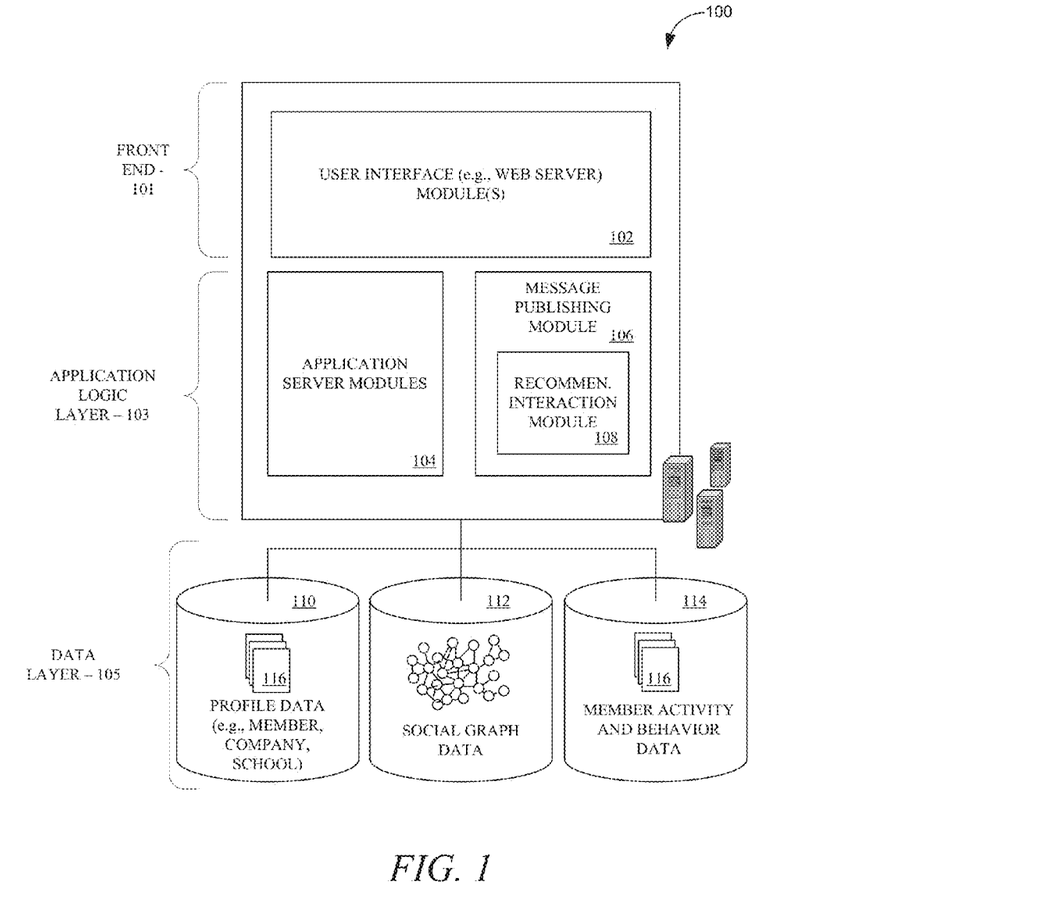
FIG. 1 is a block diagram illustrating various components or functional modules of a social network.

FIG. 1 is a block diagram illustrating various components or functional modules of a social network 100, consistent with some examples. As shown in FIG. 1, a front end 101 consists of a user interface module (e.g., a web server) 102, which receives requests from various client-computing devices, and communicates appropriate responses to the requesting client devices. For example, the user interface module(s) 102 may receive requests in the form of Hypertext Transport Protocol (HTTP) requests, or other web-based, application programming interface (API) requests. An application logic layer 103 includes various application server modules 104, which, in conjunction with the user interface module(s) 102, may generates various user interfaces (e.g., web pages) with data retrieved from various data sources in a data layer 105. In some examples, individual application server modules 104 may be used to implement the functionality associated with various services and features of the social network service. For instance, the ability of an organization to establish a presence in the social graph of the social network 100, including the ability to establish a customized web page on behalf of an organization, and to publish messages or status updates on behalf of an organization, may be services implemented in independent application server modules 104. Similarly, a variety of other applications or services that are made available to members of the social network service may be embodied in their own application server modules 104. Alternatively, various applications may be embodied in a single application server module 104.

In some examples, the social network 100 includes a message publishing module 106, such as may be utilized to receive content, such as messages, posts, links, images, videos, and the like, and publish the content to the social network. The message publishing module 106, or the social network 100 generally, may include a recommended interaction module 108. As will be disclosed in detail herein, the recommended interaction module 108 may generate and present, such as via the message publishing module 106, recommended interactions for particular members of the social network 100 based on a relevance of various events, such as are stored in the data layer 105 or obtained via the application server module 104, the message publishing module 106, and/or the social network 100 generally.

As illustrated, the data layer 105 includes, but is not necessarily limited to, several databases 110, 112, 114, such as a database 110 for storing profile data, including both member profile data as well as profile data for various organizations. Consistent with some examples, when a person initially registers to become a member of the social network service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database with reference number 110. Similarly, when a representative of an organization initially registers the organization with the social network service, the representative may be prompted to provide certain information about the organization. This information may be stored, for example, in the database with reference number 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some examples, a member may elect to "follow" another member. In contrast to establishing a connection, the concept of "following" another member typically is a unilateral operation, and at least with some examples, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 112.

The social network service may provide a broad range of other applications and services that allow members the opportunity to share and receive information, often customized to the interests of the member. For example, with some examples, the social network service may include a photo sharing application that allows members to upload and share photos with other members. With some examples, members may be able to self-organize into groups, or interest groups, organized around a subject matter or topic of interest. With some examples, the social network service may host various job listings providing details of job openings with various organizations.

As members interact with the various applications, services and content made available via the social network service, the members' behavior (e.g., content viewed, links selected, etc.) may be monitored and information concerning the member's behavior may be stored, for example, as indicated in FIG. 1 by the database with reference number 114. This information may be used to classify the member as being in various categories. For example, if the member performs frequent searches of job listings, thereby exhibiting behavior indicating that the member is a likely job seeker, this information can be used to classify the member as a job seeker. This classification can then be used as a member profile attribute for purposes of enabling others to target the member for receiving messages or status updates. Accordingly, a company that has available job openings can publish a message that is specifically directed to certain members of the social network service who are job seekers, and thus, more likely to be receptive to recruiting efforts.

The profile data database 110 and the member activity database 114 may, among other sources in the social network 100, include or store events 116. Such events include but are not limited to birthdays, anniversaries, change of status (employment, location, etc.), a publication, and a previous interaction.

Although not shown, with some examples, the social network 100 provides an application programming interface (API) module via which third-party applications can access various services and data provided by the social network service. For example, using an API, a third-party application may provide a user interface and logic that enables an authorized representative of an organization to publish messages from a third-party application to various content streams maintained by the social network service. Such third-party applications may be browser-based applications, or may be operating system-specific. In particular, some third-party applications may reside and execute on one or more mobile devices (e.g., phone, or tablet computing devices) having a mobile operating system.

User Interface

Figure 2:
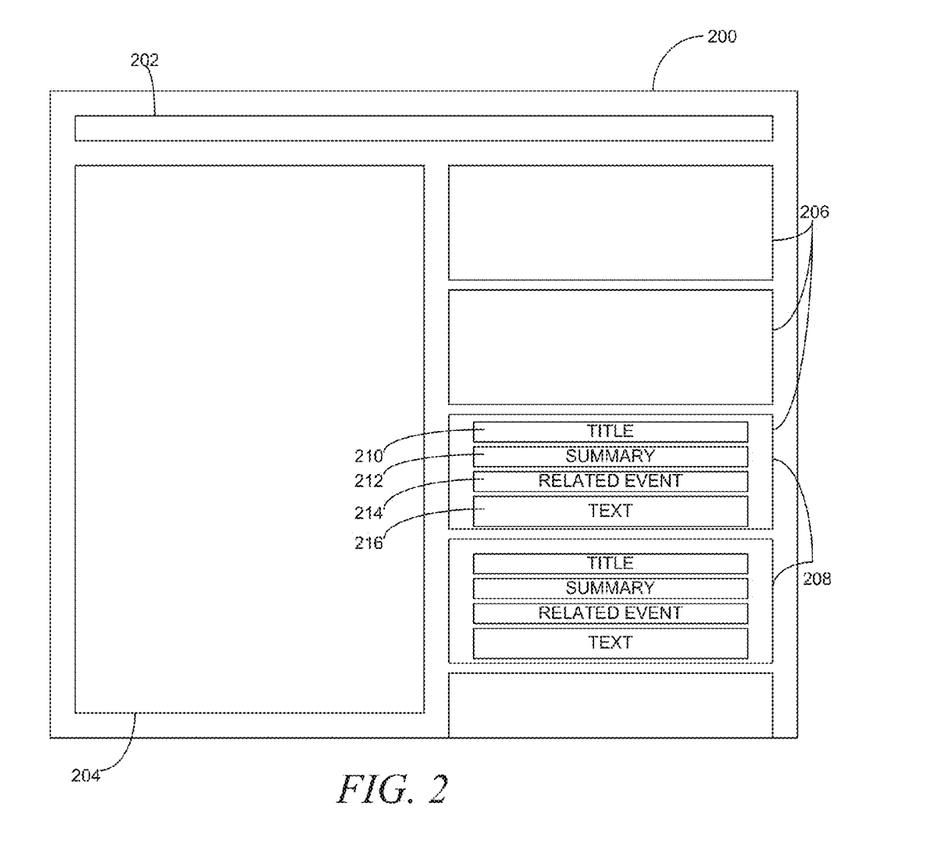
FIG. 2 is a simple user interface for displaying recommended interactions based on a relevance of an event to a member of a social network.

FIG. 2 is a simple user interface 200 for displaying recommended interactions based on a relevance of an event 116 to a member of the social network 100. It is to be recognized that the user interface 200 may incorporate any of a variety of additional information, related to social network activity or otherwise, not explicitly shown here.

The user interface 200 is a user interface such as may be generated by the user interface module 102 and displayed on a user device, such as a personal computer, tablet computer, smartphone, or any device configured to display a webpage, network-connected application, or other information-displaying mechanism. The user interface 200 includes a menu field 202, an update stream 204, and information fields 206. The menu field 202 may be utilized to select various specific functions of the social network 100. The update stream 204 may present general information related to the social network 100, including relating to various events 116. The information fields 206 may present information including recommendations, advertisements, and statistics related to the social network 100, and may include events 116. While the user interface 200 as illustrated may be optimized for a particular user device, such as a personal computer or a tablet computer, it is to be understood that the user interface 200 may be optimized for various devices and that such user interfaces 200 may incorporate different fields and/or information than what is illustrated with respect to the user interface 200 as illustrated.

The social network 100 may, at times, present recommended interactions 208 in one or more of the information fields 206 or elsewhere in the user interface 200. For instance, the recommended interactions 208 may appear in the update stream 204 or as a popup window or other information display mechanism. The recommended interaction 208 as displayed in the information field 206 may include a link that, when clicked, produces a popup window with additional information.

As illustrated, the recommended interaction 208 includes a title 210, a summary 212, related events 214, and a text field 216 for inputting a message related to the recommended interaction 208. Various recommended interactions 208 may omit one or more items, such as related events 214, where such items do not apply to the particular recommended interaction 208. For instance, if the recommended interaction 208 is relates to congratulating a writer on a new publication, the related event 214 may include a link to the publication. By contrast, if the recommended interaction 208 relates to a member having moved to a new city, the related event 214 may either be omitted or may present information related to the new city.

The title 210 may be a short descriptor of the recommended interaction, such as a few words or a short sentence. The summary 212 may be a relatively longer descriptor, such as one or more sentences related to the recommended interaction 208 and a description of an event or events 116 that underlie the recommended interaction 208. The text field 216 may be initially blank or may come pre-populated with a recommended message that may be modified by the member for transmittal to the entity related to the recommended interaction, as detailed below. The text ultimately entered into the text field 216 may be transmitted to the entity relating to the recommended interaction 208, such as by email, instant message, text, and other forms of communication.

In an example, a recommended interaction 208 may be a reminder that a certain amount of time has lapsed since a member has communicated with an entity, such as another member of the social network 100. For instance, a member may set a time period of six (6) months since a previous communication with an entity, upon which a recommended interaction 208 may be presented to the member with a title 210 "Reconnect", a summary 212 noting the passage of time since the previous communication, and a pre-populated message "Hey, it's been a while, how are you doing?" may be included in the text field 216.

In an example, a recommended interaction 208 may be a notification that an entity, such as another member, as moved to the same geographic area as the member corresponding to the user interface. The text field 216 may include a pre-populated message "Welcome to town! Let's get together soon." In another example, a recommended interaction 208 may be a notification that an entity, such as another member, has published an article. The related event 214 may include a link to the article and the text field 216 may include a pre-populated message "Congrats on the new article!"

Additional events 116 that may be the subject of recommended interactions include, but are not limited to, birthdays, work anniversaries, new jobs, being included in a news story, participation in an upcoming event, and the like. It is noted that any event 116 may be the subject of a recommended interaction. However, whether a recommended interaction 208 comes with a related event link 214 or a pre-populated message in the text field 216 may depend on whether a type of event 116 has been previously categorized and a pre-populated message generated. Events 116 that have not been previously categorized may nevertheless be the subject of a recommended interaction 208, but may have relatively less rich associated content.

An event 116 may also be based on aggregate individual events 116. For instance, an entity such as an individual or a company may have a certain consistent baseline of activity in news articles, such as by being mentioned in the article. In an example, an entity is mentioned in searchable news articles an average of ten times per day over a six-month period. In an example, references to the entity may increase to twenty times per day over a period of a week. While each reference in an article may count as an event 116, the increase in references may also be identified as an event 116. In an example, an increase in the references to an entity in news articles of at least one standard deviation may qualify as an event 116.

Recommended Interaction Module

The recommended interaction module 108 may produce recommended interactions 208 for display on the user interface 200 based on a relevance of various events 116 to a member of the social network 100 corresponding to the user interface 200. In an example, the recommended interaction module 108 may obtain or otherwise monitor events 116 as produced by the social network 100 and, optionally, stored in the various databases 110, 112, 114. Additionally, as will be discussed below, the recommended interaction module 108 may obtain events 116 from sources outside of social network 100, such as from the Internet or other network sources.

On the basis of the events 116, the recommended interaction module 108 may generate recommended interactions 208, but the recommended interaction module 108 may limit a number of recommended interactions 208 actually sent to the message publishing module 106 for display on the user interface 200. The number of recommended interactions 208 that are sent to the user interface 200 may be limited to a predetermined number that may be selected so as to prevent clutter or to reduce a likelihood of the member finding the number of interactions 208 display to be overwhelming. In various examples, the number of interactions 208 displayed on the user interface may be limited to from three (3) to five (5).

The recommended interaction module 108, specifically, or the social network 100 generally, may prioritize recommended interactions 208, whether in the initial generation of the recommended interactions 208, or upon the recommended interactions 208 having been generated but not yet transmitted to the user interface 200 for display to the member. As such, the recommended interaction module 106 may generate some or all of the recommended interactions 208 and then determine the most relevant recommended interactions 208 to the member. Alternatively, the recommended interaction module 106, specifically, or the social network 100, generally, may either pre-assess events 116 for relevance prior to generating associated recommended interactions 208 or may assess relevance of events 116 and/or recommended interactions 208 concurrently with the generation of the recommended interactions 208 and stop generating new recommended interactions 208 upon the recommended interaction 208 limit having been met.

The recommended interaction module 108 may determine a relevance of a recommended interaction 208 (or a potential recommended interaction 208, such as based on an underlying event 116) based on one or more traits of the member to whom the recommended interaction 208 is going to be presented and one or more characteristics of the event 116. The trait may be from profile data of the member, such as may be stored in the profile database 110. The characteristic of the event 116 may be determined from the nature and details of the event 116 itself and/or from the entity related to the event 116.

In an example, individual traits and characteristics of the member and event 116, respectively, may be paired and assessed cumulatively, as a weighted average, or according to other methods known in the art. For instance, if the event 116 is an employee's anniversary at a company, a relevance factor may be high if the member is also an employee of the company or is a follower of the company on the social network, may be lower if the member is in the same industry as the company, or may be low to none if the member is neither employed by the company nor in the same industry.

Relevance may be based on activity within the member's social graph, such as may be stored in the social graph database 112. For instance, even if a particular article published by an entity has no substantive relevance to the member, relevance may be identified based on a reaction of parts of the member's social graph to the article. If multiple connections from the member's social graph read, commented on, liked, or otherwise interacted with the article, the article may be determined to be relevant to the member. For instance, relevance may be based on the actual number of social graph connections that have interacted with the article.

Relevance may be determined from a variety of factors. In the above example, relevance may be determined further based on the social connectedness of the member and the employee. For instance, the anniversary may be of relatively high relevance to the member if the employee is a family member or friend with whom the member has a strong connection strength on the social network 100. Connection strength may be measured by an amount or frequency of communication on the social network, the number of shared acquaintances on the social network 100, and other connectedness factors. Similarly, if the member and the employee are not closely connected on the social network, such as because they are not related or only infrequently communicate, the relevance may be low. Such information may be available in the social graph database 112.

Relevance may be further determined by a connection density between the member and the employee. For instance, in addition to communication over the social network 100 itself, connection density may be determined by a number of other forums over which the member and the employee may communicate. For instance, the social network 100 may be informed as to communication between the member and the employee via other social networks, email, text, telephone, video chat, and the like. In such examples, the social network 100 may be granted access, at least to the existence of the communication if not the content of the communication, by outside sources via the Internet or a network. Relevance may be determined by a number of communication platforms over which the member and the employee communicate; if other social networks are used along with email and text, relevance may be higher than if the employee and member are only known to communicate over the social network 100.

Relevance may thus be based on factors specific to the event 116, such as the comparison of employers in the above example, and factors related to the member and the entity associated with the event 116 rather than the event 116 itself. In various examples, only factors specific to the event 116 are considered for relevance. In various examples, only factors related to the member and the entity are considered.

In various examples, relevance values for employees from the same company may be higher than in cases where the individuals involved are not employees of the same company. In an example, relevance may be obtained by assigning values to various factors and summing or averaging the values. For instance, in the above example, a relevance value for employees from the same company may be a "1" while a relevance value for individuals who are not from the same company may be a "0". Alternative examples may provide for more factors or differentiation. For instance, a relevance value for employees from the same company may be a "3", a relevance value for the member following the company may be a "2", a relevance value for the member being in the same industry as the company may be a "1", and a non-relationship to the company may produce a relevance value of "0".

Upon acquiring the relevance values for the event 116 in relation to the member, the values may be summed, averaged, or otherwise manipulated to determine an overall relevance score for the event 116. In an example, all events 116 related to the member are given an overall relevance score, and the events 116 and/or the associated recommended interactions 208 are selected by choosing the events 116/recommended interactions 208 with the highest relevance up to the predetermined limit. In various examples, a minimum relevance threshold may be applied, such that even if the maximum recommended interactions 208 limit is not reached, only recommended interactions 208 that meet the minimum relevance are presented on the user interface 200.

As noted above, recommended interactions may be based on a variety of events 116 that affirmatively occur and events 116 that occur through omission of an action. Thus, for instance, the recommendation interaction module 108 may consider communication between the member and an entity both on the social network 100 and/or elsewhere and not, for instance, that there has been a decline in communication between the member and the entity generally. For instance, the recommendation interaction module 108 may note that the member and the entity had typically communicated at least weekly up until six (6) months ago but that communication has fallen off and is now not more than monthly. In such a scenario, the event 116 may be that communication between the member and the entity has been relatively low for six (6) months and that a recommended interaction 208 may be generated and presented to the member notifying the member of that fact and recommending a message to promote additional communication.

Relevance may have a time factor depending on the event 116. For instance, a birthday event 116 may have relevance only on the day of the birthday, or for just one or two days after the birthday. Conversely, a change of location, such as from moving to a new city, may be relevant for a month or more after the actual occurrence of the event 116. The relevance for events 116 may be weighted based on the passage of time, and the weight may vary for different types of events 116. Events 116 may be categorized, with the weight decaying quickly for certain events 116, moderately for other events 116, and slowly for other events 116. For instance, a fast decay may reduce total relevance by one-third for every day after the occurrence of the event 116, a moderate decay may reduce total relevance by one-third for every three days to one week after the occurrence of the event 116, and a slow decay may reduce total relevance by one-third for every two weeks after the occurrence of the event 116. Thus, a birthday, which may have a fast decay, may have no relevance after two or three days; a work anniversary, which may have a moderate decay, may have no relevance after one to two weeks; a change of location may have no relevance after one to two months.

Relevance may be further modified based on prior member interaction with the recommended interactions 208 as presented to the user. For instance, if the member seldom or never congratulates an employee on a company anniversary, the weight applied to anniversaries may be reduced. Relatedly, if a member usually or always responds to birthday recommended interactions 208, the weight applied to birthdays may be increased.

Recommended interactions 208 may be presented to the member according to a variety of durations. For instance, a recommended interaction 208 may be presented once and then not again regardless of whether or not the member followed, ignored, or dismissed the recommended interaction 208. Alternatively, ignored recommended interactions 208 may be persistently displayed until acted upon, ignored, or until the relevance of the event 116 has dropped below the relevance threshold.

Figure 3:
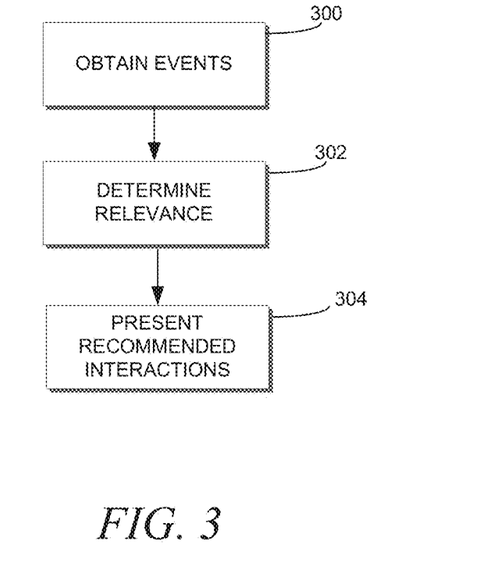
FIG. 3 is a flowchart for generating recommended interactions based on a relevance to the member to whom the recommended interactions are being presented.

FIG. 3 is a flowchart for generating recommended interactions 208 based on a relevance to the member to whom the recommended interactions 208 are being presented. While the flowchart is presented with respect to the social network 100 and recommended interactions 208, it is to be recognized that the steps of the flowchart may be applied to any of a variety of social networks and may produce any of a variety of recommended interactions 208.

At 300, events related to individual ones of a plurality of entities are obtained.

At 302, a relevance of ones of the events to the member is determined based on at least one characteristic of ones of the events and a trait of the member. In various examples, the relevance for at least one event is based, at least in part, on an interaction by a second member of the social network with the event. In an example, the second member has a social network connection with the member. In an example, the member has received a previous recommended interaction, and the relevance for at least one event is based on a reaction by the member to the previous recommended interaction.

In various examples, the relevance is based on a time since the event occurred. In an example, the relevance is based on a relation between the at least one characteristic of the event and the time since the event occurred. In an example, the relevance is based on an amount of prior communication between the member and the entity. In an example, the relevance is based on a number of forums in addition to the social network over which the member and the entity have communicated.

Figure 4:
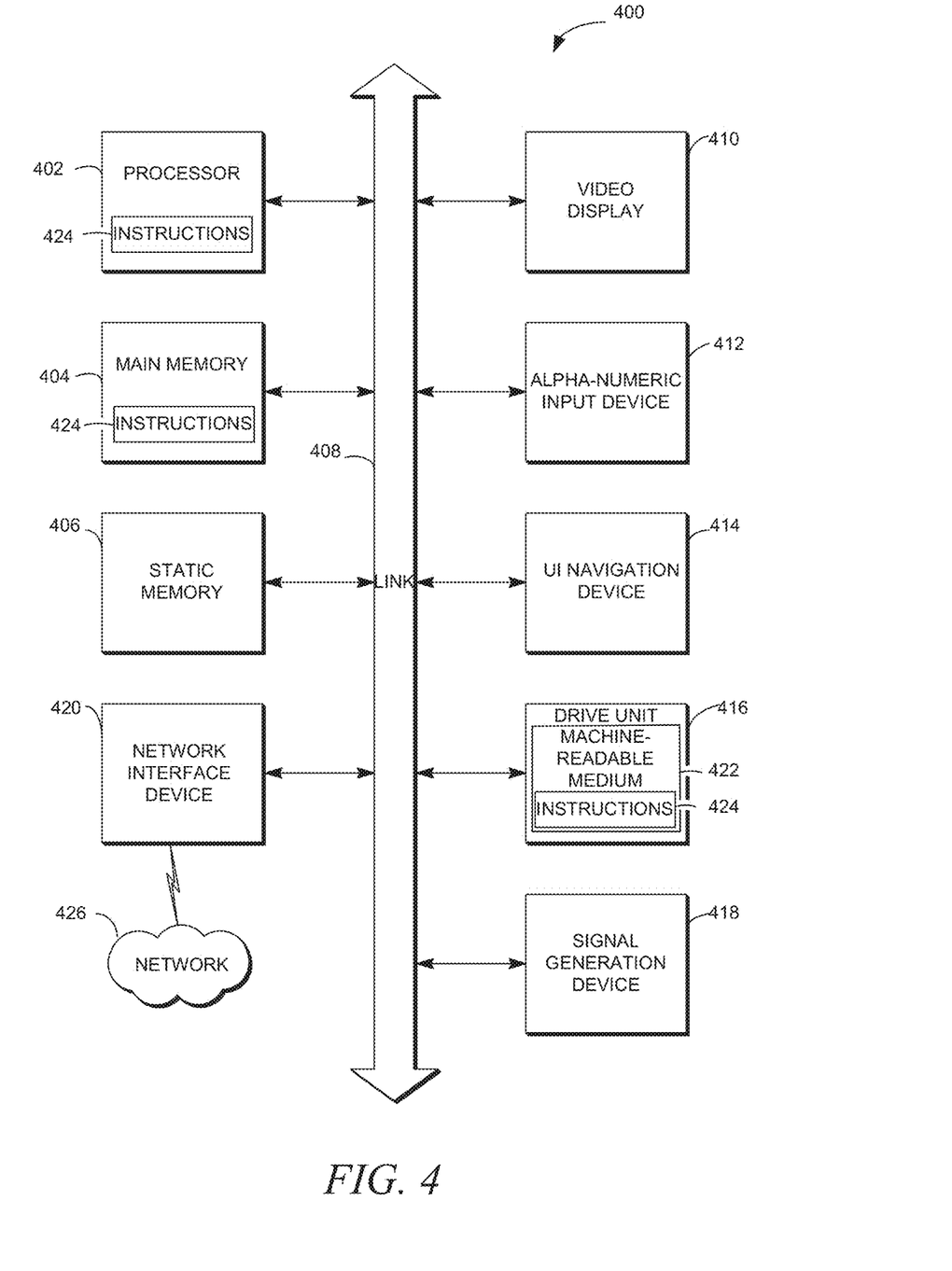
FIG. 4 is a block diagram illustrating components of a machine able to read instructions from a machine-readable medium.

In an example, at least one of the trait of the member and the characteristic of the entity is at least one of a social network connection with at least one of the plurality of entities, an employment status, a geographic location, and prior communication with the entity outside of the social network. In an example, the relevance is a numerical relevance, and wherein presenting the recommended interactions comprises displaying only recommended interactions with a numerical relevance greater than a predetermined minimum value At 304, recommended interactions with ones of the plurality of entities individually related to the ones of the events based on the relevance for each of the events are presented to the member. In an example, presenting the recommended interactions includes displaying not more than a predetermined maximum number of recommended interactions FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system and within which instructions 424 (e.g., software) for causing the machine 400 to perform any one or more of the methodologies discussed herein may be executed. In alternative embodiments, the machine 400 operates as a standalone device or may be connected (e.g., networked) to other machines. In a networked deployment, the machine 400 may operate in the capacity of a server machine or a client machine in a server-client network environment, or as a peer machine in a peer-to-peer (or distributed) network environment. The machine 400 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 424, sequentially or otherwise, that specify actions to be taken by that machine. Further, while only a single machine is illustrated, the term "machine" shall also be taken to include a collection of machines that individually or jointly execute the instructions 424 to perform any one or more of the methodologies discussed herein.

The machine 400 includes a processor 402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 404, and a static memory 406, which are configured to communicate with each other via a bus 408. The machine 400 may further include a graphics display 410 (e.g., a plasma display panel (PDP), a light emitting diode (LED) display, a liquid crystal display (LCD), a projector, or a cathode ray tube (CRT)). The machine 400 may also include an alphanumeric input device 412 (e.g., a keyboard), a cursor control device 414 (e.g., a mouse, a touchpad, a trackball, a joystick, a motion sensor, or other pointing instrument), a storage unit 416, a signal generation device 418 (e.g., a speaker), and a network interface device 420.

The storage unit 416 includes a machine-readable medium 422 on which is stored the instructions 424 (e.g., software) embodying any one or more of the methodologies or functions described herein. The instructions 424 may also reside, completely or at least partially, within the main memory 404, within the processor 402 (e.g., within the processor's cache memory), or both, during execution thereof by the machine 400. Accordingly, the main memory 404 and the processor 402 may be considered as machine-readable media. The instructions 424 may be transmitted or received over a network 426 via the network interface device 420.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 422 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 400), such that the instructions, when executed by one or more processors of the machine (e.g., processor 402), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method for recommending to a member of a social network an interaction with ones of a plurality of entities, comprising:
obtaining, with a processor, events related to individual ones of the plurality of entities;
determining, with the processor, a plurality of relevance scores of the events, each relevance score of the plurality of relevance scores being indicative of a relevance of at least one of the events to the member, each relevance score of the plurality of relevance scores individually corresponding to one of the events, each of the plurality of relevance scores being determined based on at least one characteristic of ones of the events in comparison with a trait of the member;
presenting, via a network interface device, to the member recommended interactions with ones of the plurality of entities individually related to the ones of the events based on the relevance score as determined for each of the events.

2. The method of claim 1, wherein the member is a first member, wherein the relevance score for at least one event is based, at least in part, on an interaction by a second member of the social network with the at least one event, wherein the at least one event is related to an entity different than the first member and the second member.

3. The method of claim 2, wherein the second member has a social network connection with the first member.

4. The method of claim 1, wherein the member has received a previous recommended interaction, and wherein the trait of the member is based on a reaction by the member to the previous recommended interaction.

5. The method of claim 1, wherein the at least one characteristic of ones of the events is based on a time since the event occurred.

6. The method of claim 5, wherein the at least one characteristic of ones of the events is based on a relation between another characteristic of the event and the time since the event occurred.

7. The method of claim 1, wherein the trait of the member is based on an amount of prior communication between the member and an entity associated with the at least one of the plurality of events.

8. The method of claim 1, wherein the trait of the member is based on a number of forums in addition to the social network over which the member and an entity associated with the at least one of the plurality of events have communicated.

9. The method of claim 1, wherein at least one of the trait of the member and the characteristic of the at least one of the plurality of events is at least one of a social network connection with an entity associated with the at least one of the plurality of events, an employment status, a geographic location, and prior communication with the entity outside of the social network.

10. The method of claim 1, wherein presenting the recommended interactions comprises displaying not more than a predetermined maximum number of recommended interactions.

11. The method of claim 1, wherein the plurality of relevance scores are numerical relevance scores, and wherein presenting the recommended interactions comprises displaying only recommended interactions with a numerical relevance greater than a predetermined minimum value.

12. A system, comprising:
a processor configured to:
obtain events related to individual ones of the plurality of entities;
determine a plurality of relevance scores of the events, each relevance score of the plurality of relevance scores being indicative of a relevance of at least one of the events to the member, each relevance score of the plurality of relevance scores individually corresponding to one of the events, each of the plurality of relevance scores being determined based on at least one characteristic of ones of the events in comparison with a trait of the member; and
generate a recommended interactions with ones of the plurality of entities individually related to the ones of the events based on the relevance score as determined for each of the events a user interface device configured to present to the member the recommended interactions.

13. The system of claim 12, wherein the member is a first member, wherein the relevance score for at least one event is based, at least in part, on an interaction by a second member of the social network with the event, wherein the event is related to an entity different than the first member and the second member.

14. The system of claim 13, wherein the second member has a social network connection with the first member.

15. The system of claim 12, wherein the member has received a previous recommended interaction, and wherein the trait of the member is based on a reaction by the member to the previous recommended interaction.

16. The system of claim 12, wherein the at least one characteristic of ones of the events is based on a time since the event occurred.

17. The system of claim 15, wherein the at least one characteristic of ones of the events is based on a relation between another characteristic of the event and the time since the event occurred.

18. The system of claim 12, wherein the trait of the member is based on an amount of prior communication between the member and an entity associated with the at least one of the plurality of events.

19. The system of claim 12, wherein the trait of the member is based on a number of forums in addition to the social network over which the member and an entity associated with the at least one of the plurality of events have communicated.

20. The system claim 12, wherein at least one of the trait of the member and the characteristic of the at least one of the plurality of events is at least one of a social network connection with an entity associated with the at least one of the plurality of events, an employment status, a geographic location, and prior communication with the entity outside of the social network.

21. The system of claim 12, wherein the user interface device is configured to display not more than a predetermined maximum number of recommended interactions.

22. The system of claim 12, wherein the plurality of relevances are numerical relevances, and wherein the user interface device is configured to display only recommended interactions with a numerical relevance greater than a predetermined minimum value.

* * * * *

UNITED STATES PATENT AND TRADEMARK OFFICE
CERTIFICATE OF CORRECTION

PATENT NO. : 9,619,846 B2  
APPLICATION NO. : 13/903263  
DATED : April 11, 2017  
INVENTOR(S) : Sachin Rekhi Page 1 of 1

It is certified that error appears in the above-identified patent and that said Letters Patent is hereby corrected as shown below:

In the Claims

In Column 14, Line 67, in Claim 12, after "events", insert --;--

Signed and Sealed this
Fifth Day of May, 2020

Andrei Iancu
*Director of the United States Patent and Trademark Office*